United States Patent
Steiger et al.

(10) Patent No.: US 9,267,385 B2
(45) Date of Patent: Feb. 23, 2016

(54) STRIP SEAL AND METHOD FOR DESIGNING A STRIP SEAL

(71) Applicant: ALSTOM Technology Ltd, Baden (CH)

(72) Inventors: Ulrich Robert Steiger, Baden-Dättwil (CH); Thomas Heinz-Schwarzmaier, Wettingen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

(21) Appl. No.: 14/489,630

(22) Filed: Sep. 18, 2014

(65) Prior Publication Data
US 2015/0001815 A1    Jan. 1, 2015

Related U.S. Application Data

(63) Continuation of application No. PCT/EP2013/055782, filed on Mar. 20, 2013.

(30) Foreign Application Priority Data

Mar. 21, 2012 (EP) .................................... 12160480

(51) Int. Cl.
*F16J 15/02* (2006.01)
*F01D 11/00* (2006.01)
*F16J 15/08* (2006.01)

(52) U.S. Cl.
CPC .......... *F01D 11/005* (2013.01); *F16J 15/0887* (2013.01); *F05B 2240/572* (2013.01); *F05B 2250/184* (2013.01); *F05D 2240/55* (2013.01)

(58) Field of Classification Search
CPC .......... F16J 15/02; F16J 15/021; F01D 11/00; F01D 11/005; F01D 11/08
See application file for complete search history.

(56) References Cited

U.S. PATENT DOCUMENTS

| | | |
|---|---|---|
| 3,836,279 A | 9/1974 | Lee |
| 4,323,253 A | 4/1982 | Pomfret |
| 5,531,457 A | 7/1996 | Tibbott et al. |

(Continued)

FOREIGN PATENT DOCUMENTS

| | | |
|---|---|---|
| CN | 101287898 A | 10/2008 |
| CN | 102278147 A | 12/2011 |
| EP | 0 979 961 A1 | 2/2000 |

(Continued)

OTHER PUBLICATIONS

First Office Action issued Aug. 17, 2015 by the Chinese Patent Office in corresponding Chinese Patent Application No. 201380015438.0, and an English translation thereof.

*Primary Examiner* — Gilbert Lee
(74) *Attorney, Agent, or Firm* — Buchanan Ingersoll & Rooney PC (57) ABSTRACT

A strip seal and method of configuration thereof for sealing portions of components of a gas turbine exposed to pressure pulsations. The strip seal has a sealing face that is configured to follow the contours of first portions of the components. The strip seal further has a pressure face that has a sinusoidal curvilinear shape with respect to the sealing face. The pressure face is configured to prevent localized movement of strip seal by configuring pressure face on its first side to contact sealing face at a plurality of points, on its second side to contact second portions of the components at a plurality of points.

15 Claims, 7 Drawing Sheets

Isometric view of the new seal

Seal in Vane ID

(56) References Cited

U.S. PATENT DOCUMENTS

| | | |
|---|---|---|
| 6,315,301 B1 | 11/2001 | Umemura et al. |
| 8,069,673 B2 | 12/2011 | Kunitake et al. |
| 8,398,090 B2 | 3/2013 | McMahan et al. |
| 2004/0052637 A1 | 3/2004 | Paprotna et al. |
| 2005/0179215 A1* | 8/2005 | Kono ............................ 277/628 |
| 2010/0061837 A1 | 3/2010 | Zborovsky et al. |
| 2010/0187762 A1* | 7/2010 | Heinz-Schwarzmaier et al. ............................ 277/312 |

FOREIGN PATENT DOCUMENTS

| | | |
|---|---|---|
| EP | 1 918 549 A1 | 5/2008 |
| EP | 2 395 201 A2 | 12/2011 |
| WO | 2010/027384 A1 | 3/2010 |

* cited by examiner

STRIP SEAL AND METHOD FOR DESIGNING A STRIP SEAL

CROSS-REFERENCE TO RELATED APPLICATIONS

This application claims priority to PCT/EP2013/055782 filed Mar. 20, 2013, which claims priority to European application 12160480.5 filed Mar. 21, 2012, both of which are hereby incorporated in their entireties.

TECHNICAL FIELD

The present invention relates to strip seals.

In particular, the present invention relates to design of strip seals that are used for sealing portions of components in a gas turbine. The strip seals fit into grooved recesses formed between two portions of components, when two components are placed substantially adjacent. Each component has two portions, first portion where low pressure acts, and second portion where high pressure acts. The strip seal forms a substantially gas tight seal between two portions of components; separating the first portion from the second portion. More specifically the invention relates to methods of designing strip seals for use in the above-mentioned way to seal gas turbine components in hot gas section of a gas turbine.

BACKGROUND

Strip seals, also known as feather seals, can be used to eliminate leakage flow between two components arranged adjacently to one another. This is achieved by the two components having groove recesses in edge faces that lie substantially opposite and adjacent one another. The strip seal seals the gap between the two components by being at least partially received into the groove recesses of the adjacently fitted components so as to span the gap between the components. U.S. Pat. No. 5,531,457 discloses an example of such a strip seal used to reduce leakage flow through the gap between two platforms of a blade.

The grooved recesses of fitted components often do not perfectly align due to, for example, manufacturing tolerances or as a result of thermal expansion. If the strip seal is manufactured so as to tightly fit into the groove recesses, less than perfect groove recess align would result in high stress loading of the strip seal, which can result in premature failure.

To overcome this problem strip seals can be made thinner than the height of the grooved recesses and flexible orthogonal to the strip seal length. In operation the pressure differential across the seal, due to the flexibility of the strip seal, forces the strip seal against one surface of the grooved recess so by effecting the seal. When the pressure differential is low strip seals are made thinner so as to increase their flexibility strip. To hold thin seals in place, for example during installation, the strip seal may be provided with biasing means, dispersed along the strip seal length. An example of biasing means in described in U.S. Pat. No. 3,836,279.

During operation the strip seals are exposed to periodic pressure pulsations caused by various rotating components within the gas turbine such as blades as they pass through rotating and non-rotating regions where the strip seals are contained within. These strip seals are generally placed in components like rotor blades, rotor heat shields or vane platforms and stators. The strip seals fit into the grooved recesses of components, providing a sealing between two portions of the components. A first portion faces low pressure from the hot gases, while second portion faces high pressure circulating in the gas turbine.

Depending on the strength and frequencies of the pressure pulsations, parts of the strip seal that are not biased against faces of the grooved recess or otherwise retained can be induced into periodic resonance leading to premature fatigue failure of the strip seal. This problem is particularly relevant in the sealing of components where rotating blades of the gas turbine induce pressure pulsation at sealing faces.

To overcome this problem, some strip seals designs have an arrangement of clamping projections along the length of the strip seal to suppress the damages caused due to pressure pulsations. However, these clamping projections are often worn out, as a relatively small surface area of these clamping projections makes contact with the grooved recesses of the components that are subjected to high oscillations and vibrations. There is therefore a need for a strip seal design that is resilient to fatigue failure and resonance induced by pressure pulsations caused by rotating and non-rotating components of a gas turbine.

SUMMARY

The technical aim of the present invention therefore includes designing a strip seal that addresses the aforementioned problems of the known art.

The independent claims claim a strip seal and a method for designing strip seals that overcome this problem. Advantageous embodiments are given in the dependant claims.

Within the scope of this technical aim, an aspect of the invention is to provide and design a strip seal for sealing portions of components of a gas turbine. The strip seal arrangement includes a sealing face that is configured to follow the contours of first portions of the components. The arrangement further includes a pressure face that has a sinusoidal curvilinear shape with respect to the sealing face and the pressure face is configured to prevent localized movement of the strip seal. The pressure face on its first side is configured to contact the sealing face at a plurality of points, and the pressure face on its second side is configured to contact second portions of the components at a plurality of points.

In one aspect of the invention, the strip seal has a first layer that forms the sealing face and a second layer that forms the pressure face.

In another aspect of the invention, the sinusoidal curvilinear shape of the pressure face forms projections that are configured to prevent localized movement by being configured to extend from the pressure face so as to bias the sealing face against a wall of a grooved recess of the component.

In another aspect of the invention, the strip seal is configured to be resilient fatigue failure and the induced resonance by pressure pulsations caused by rotating and non-rotating components of the gas turbine.

In a further aspect of the invention, operational excitation frequency of each of the portions of the components is determined. Thereafter, the sinusoidal shape of the pressure face of the strip seal is configured depending on either measurements or calculations done based on a frequency that the strip seal is expected to be exposed.

In yet another aspect of the invention, the plurality of contact points of the pressure face towards the sealing face and the second portions of the components are determined based on either calculations or measurements.

In a yet further aspect, the sinusoidal curvilinear shape is configured to prevent localized movement of the strip seal in the traverse direction by being configured to extend from the pressure face so as to bias the sealing face against a wall of the grooved recess.

In another aspect, the width of the pressure face and the sealing face are equal. Thus the pressure face can support the sealing face and press the sides of the sealing face against the wall of the grooved recess when inserted therein.

Other objectives and advantages of the present invention will become apparent from the following description, taken in connection with the accompanying drawings wherein by way of illustration and example, embodiments of the invention are disclosed.

BRIEF DESCRIPTION OF THE DRAWINGS

Further characteristics and advantages of the invention will be more apparent from the description of a preferred but non-exclusive embodiment of the damper arrangement illustrated by way of non-limiting example in the accompanying drawings, in which.

DETAILED DESCRIPTION

Preferred embodiments of the present disclosure are now described with reference to the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details.

Figure 1:
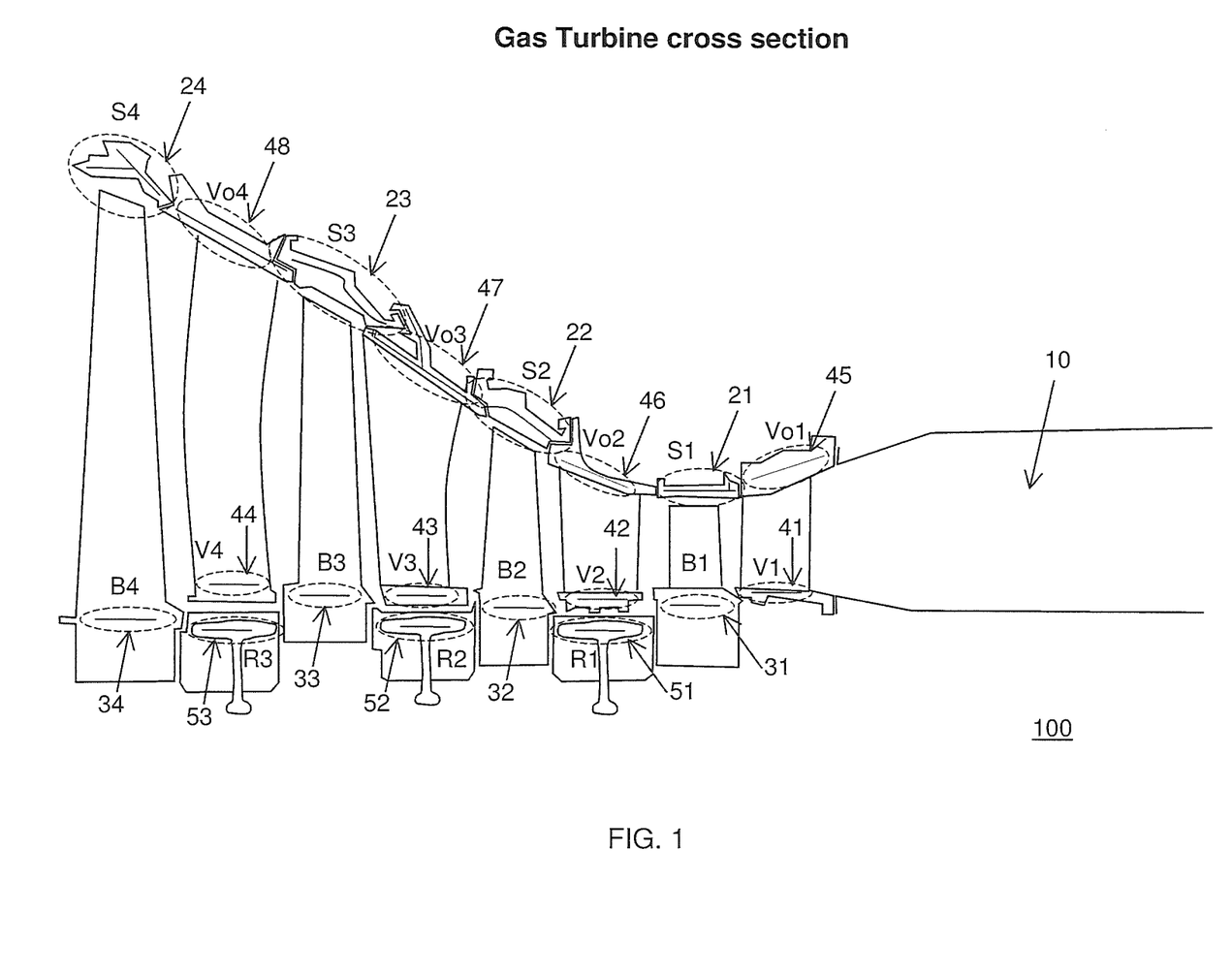
FIG. 1 is a schematic view of a portion of a gas turbine that has components with strip seals according to an exemplary embodiment of the invention.

With reference to FIG. 1 that shows a cross-sectional view of a gas turbine 100 coupled with a combustor 10. Gas turbine 100 is a standard gas turbine used in power plants that has a compressor coupled to combustion chamber, which is finally coupled to a gas turbine in downstream. For the sake of simplicity, gas turbine 100 only represents the turbine cross-section. Gas turbine 100 is made of multiple complements such as blades B1, B2, B3 and B4, vanes (Inner Diameter) ID platforms V1, V2, V3 and V4, vane (Outer Diameter) OD platforms Vo1, Vo2, Vo3 and Vo4, Rotor Heat Shields (RHS) R1, R2 and R3 and stators S1, S2, S3 and S4. Some of these components are rotating, e.g., blades, while others are non-rotating, e.g. stators. During regular operation of gas turbine 100 each of these components is subjected to very high pressure forces due to rotating components. Hence, each of these components need to be sealed against each other and also within two portions of a component to prevent the loss of high pressure medium contained in plenums (not shown) from the lower pressure hot gas of gas turbine 100. In order to do this, the strips seals (as shown by lines within dotted circular regions) circumferentially seal various rotating and non-rotating components.

The passing of rotating blades B1-B4 past non-rotating components such as stators S1-S4 and vanes V1-V4 subjects these components to pressure pulsations. Consequently seals of these components are exposed to cyclical pressure pulsation. Even the seals within components like blades and rotor heat shields face pressure pulsation and are subjected to high pressure differentials. For example, inner hot surface of the blades have a higher pressure than the outer cold surface of these blades (from where they are attached to shaft).

Circular dotted regions 21, 22, 23, 24, 31, 32, 33, 34, 41, 42, 43, 44, 45, 46, 47, 48, 51, 52, and 53 as shown in FIG. 1 are the exemplary regions of gas turbine 100 that include components that may be exposed to pressure pulsation and are subject to pressure differential. Therefore, these regions are suitable for implementing the strip seal design in accordance with various embodiments of the invention.

Regions 21, 22, 23 and 24 are the stator components S1, S2, S3 and S4 that are subjected to severe pressure pulsation from the tip of rotating blades B1, B2, B3 and B4.

Regions 31, 32, 33 and 34 are the sections of blades B1, B2, B3 and B4 where a seal strip is positioned to separate two portions of the blade from each other. The first portion is the outer/upper hot surface of the blade, while the second portion is the inner/lower cold surface of the blade. The first portion experiences a low pressure zone, while the second portion experiences a high pressure zone. Since the pressure differential between these two portions is high, a strip seal is required to avoid the pressure flow across two portions. Moreover, strip seals in these regions (31-34) may still be prone to premature fatigue failure caused by pressure pulsation due to their thin and therefore flexible nature.

Regions 41, 42, 43 and 44 are the inner diameter of the vane ID platforms V1, V2, V3, and V4 where the strip seals are positioned to separate two portions of the vane from each other. Also, regions 45, 46, 47 and 48 are the outer diameter of the vane OD platforms Vo1, Vo2, Vo3 and Vo4 where the strip seals are positioned. The strip seals in these regions are also prone to premature fatigue failure caused by pressure pulsation for similar reasons.

Regions 51, 52 and 53 are sections within rotor heat shields R1, R2 and R3, where the strip seals are positioned to separate two portions of the rotor heat shield from each other.

Figure 2:
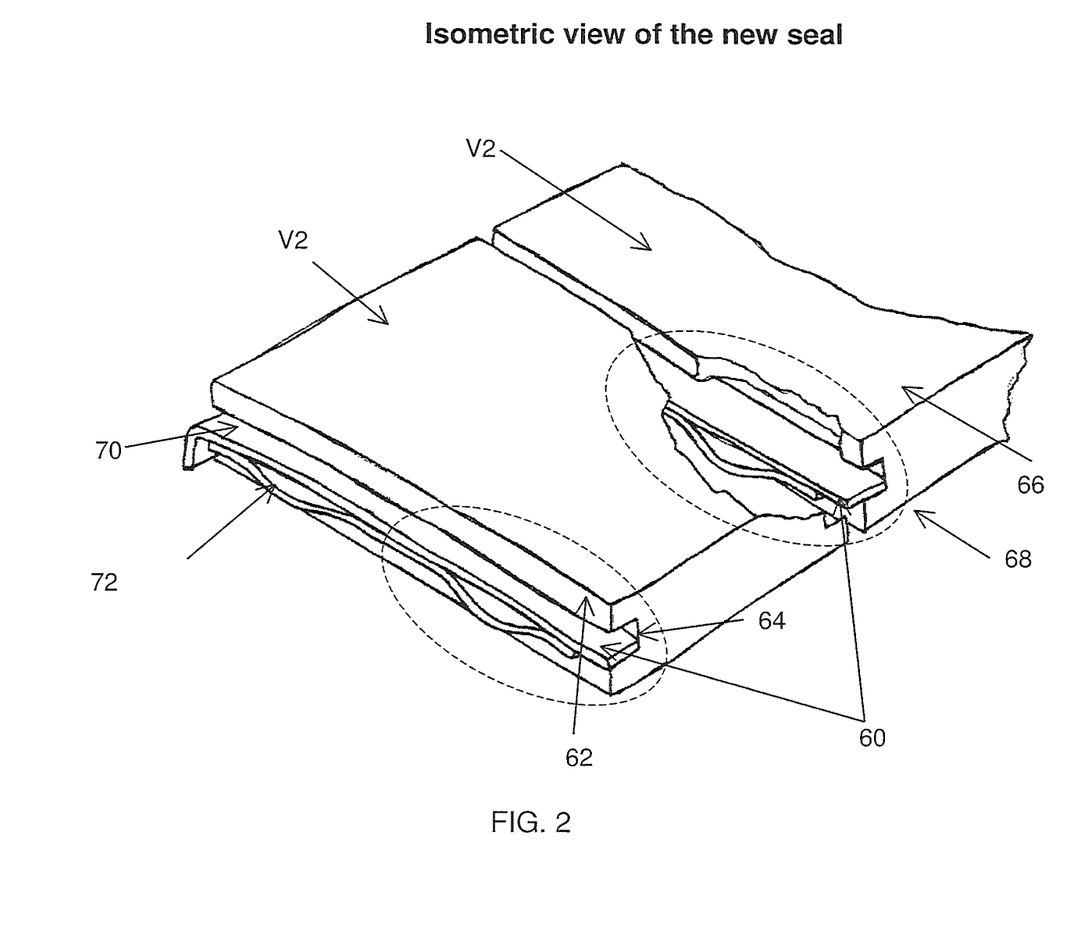
FIG. 2 is an expanded isometric view of sections of FIG. 1 showing two adjacently fitted components with strip seals according to an embodiment of the invention.

FIG. 2 is an expanded isometric view of sections of FIG. 1 showing two adjacently fitted components with strip seals according to an embodiment of the invention. The components shown in this embodiment are two adjacent vane ID platforms V2 41, from the many components that are circumferentially fitted in gas turbine 100. A strip seal 60 extending between the two vane ID components provides a means of sealing the two portions of the components. To accommodate the strip seal 60, each of the components has an edge face 62 that defines joining face between adjoining components. Each edge face 62 of each component has a grooved recess 64 complimentary to the grooved recess 64 of adjacently fitted component, and is aligned so as to enable strip seal 60 to be received in grooved recesses 64 of each adjacent component at the same time, such that the received strip seal 60 extends between both components. In this way strip seal 60 provides a seal between two portions of components, i.e., a first portion 66 and a second portion 68. The first portion 66 faces low pressure medium and second portion 68 faces high pressure medium. The ability of the grooved recesses 64 to receive strip seal 60 is also defined by the width of strip seal 60 relative to the horizontal depth of each of the grooved recesses 64.

The strip seal 60 is composed of two layers, a first layer that forms a sealing face 70 and a second layer that forms a pressure face 72. Sealing face 70 is configured to follow the contours of the first portion 66 of the components V2 (i.e. contact grooved recess 64 towards first portion 66), whereas pressure face 72 has a sinusoidal curvilinear shape (as shown in FIG. 2) with respect to sealing face 70. The pressure face 72 on its first side (i.e. top side) is configured to contact sealing face 70 at a plurality of contact points, while pressure face 72 on its second side (i.e. bottom side) is configured to contact second portion 68 of the components V2 (i.e. contact grooved recess 64 towards the second portion 68). The strip seal configuration prevents localized movement of strip seal 60 with respect to the adjacent component. The strip seal 60 has a length that extends between distal ends of the strip seal that enables it to provide a seal along length of grooved recess 64.

It will be apparent to a person skilled in the art that in the embodiment explained in conjunction with FIG. 2, only for exemplary purposes, two vane ID platforms are shown as two components. However, any two components can be taken for such implementation, like two adjacent rotor heat shields R1 or two adjacent stators S1 or even two blades B1. It would also be apparent to a person skilled in the art that two different types of components (like blade and rotor heat shield) can also be used for the implementation of this invention.

Figure 3:
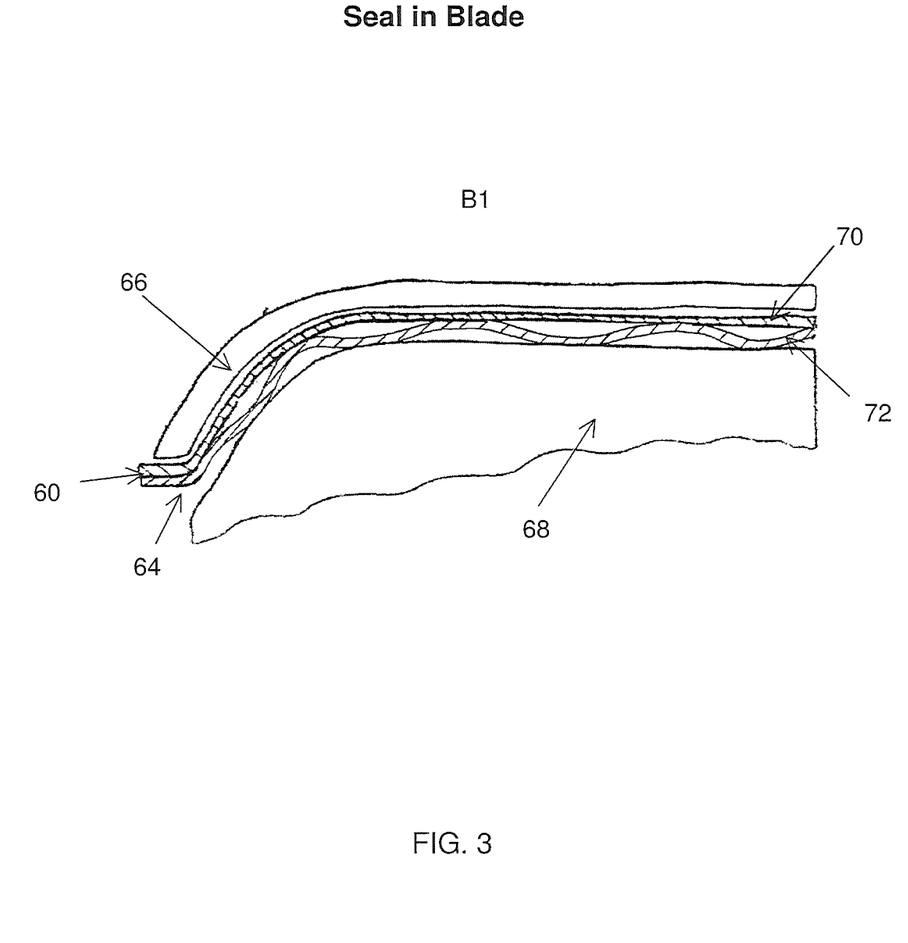
FIG. 3 is an expanded side view of a component such as blade showing a strip seal according to an exemplary embodiment of the invention.

FIG. 3 is an expanded side view of a component such as blade showing a strip seal according to an exemplary embodiment of the invention. Strip seal 60 is positioned in grooved recess 64 of a blade B1 that has two portions, first portion 66 is a blade platform towards blade airfoil side, while second portion 68 is the blade root/shank. In use the strip seal 60 provides a seal between higher and lower pressure medium acting on strip seal 60. The higher pressure acting on a pressure face 72 of strip seal 60, presses the sealing face 70 of strip seal 60 onto first portion 66 of component B1, i.e. within upper side of grooved recess 64, wherein sealing face 70 is the surface that is substantially parallel to but on the opposite side of strip seal 60 than pressure face 72. In this way, the pressure difference across strip seal 60 enables it to seal two portions 66 and 68 of the component.

In accordance with various embodiments of the invention, the thickness of strip seal 60 is defined between 0.2 mm and 0.8 mm with a variance of 0.1 mm depending on exact requirements. The thickness is defined as the dimension of strip seal 60 where sealing face 70 contacts pressure face 72. Of course, the thickness is less than the height of the grooved recess 64 so that the inserted strip seal 60 is not stressed by typical misalignment of adjacently fitted components B1 and B2.

To ensure that strip seal 60 is held firmly in grooved recess 64, pressure face 72 of the strip seal 60 is configured to have a sinusoidal curvilinear shape with respect to sealing face 70. The sine-wave helps in biasing sealing face 70 against a wall (upper wall) of grooved recess 64 towards first portion 66 of component B1. Pressure face 72 contacts on its first side with sealing face 70 at plurality of contact points, while pressure face 72 contacts on its second side with a wall (lower wall) of grooved recess 64 towards second portion 68 of component B1. Further, pressure face 72 is sealed to sealing face 72 at distal ends of strip seal 60. This eliminates any potential leak path between the two portions 66 and 68 of component. For sealing the pressure face 72 can be mechanically connected is sealed to sealing face 72 for example by a spot weld. The mechanical connection also serves to avoid vibrations of the free ends. In this way strip seal 60 is held firmly at discrete points in the grooved recess 64 so as to prevent localised movement independent of the pressure difference across strip seal 60 or pressure pulsations strip seal 60 may be exposed to.

As the surface area of the contact points is enlarged due to sine-wave structure, it decreases the force density (force per unit area). The sine-wave form allows some perpendicular motion that decreases peaks of the force density variation. Hence, the material of strip seal 60 is not plastically deformed and is always deformed in elastic range. The sine-wave form due its spring force improves the contacts points between sealing face 70 and first portion 66 (hot side) of component. The sine-wave also prevents induced vibrations and premature damage of strip seal 60. This structure also helps in reduction of cyclic deflections experienced by strip seal 60 during operation of gas turbine 100.

In accordance with various embodiments of the invention, strip seal 60 is made of metal. The frequency at which strip seal 60 is induced to resonance is influenced by the length, thickness and material properties of strip seal 60. The material property of particular importance is the dynamic modulus of elasticity at the operating temperature. The thickness of strip seal is between 0.2 mm to 0.8 mm+/−0.1 mm and most preferably between 0.3 mm to 0.5 mm+/−0.1 mm. A thicker seal makes the sine-wave more rigid and better equipped to handle induced resonance. Very thin seals lack durability and potentially do not have sufficient rigidity to provide a localised sealing function.

Figure 4:
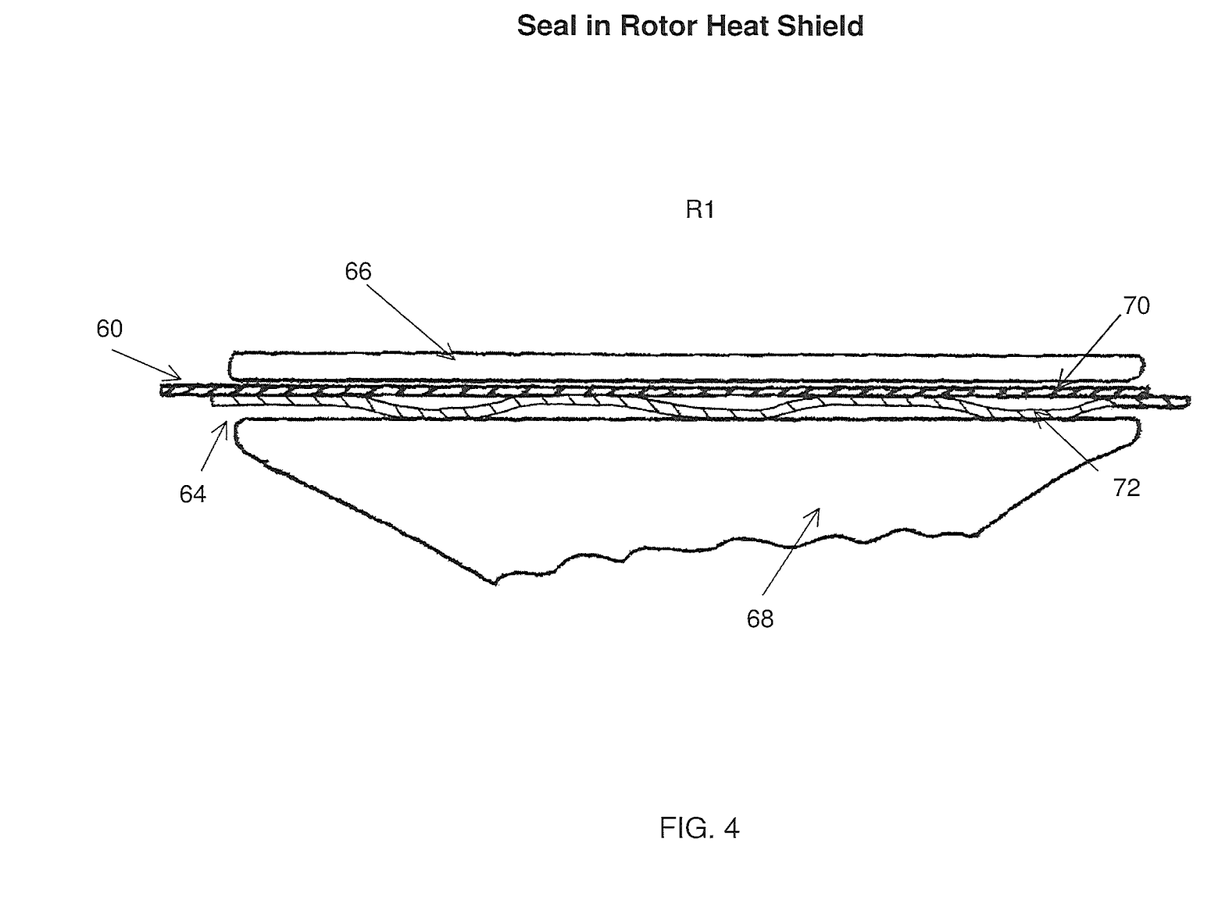
FIG. 4 is an expanded side view of a component such as rotor heat shield showing another strip seal according to an exemplary embodiment of the invention.

FIG. 4 is an expanded side view of a component such as rotor heat shield showing strip seal 60 according to an exemplary embodiment. In this embodiment, a rotor heat shield R1 houses strip seal 60, in grooved recess 64 of the rotor heat shield R1, that has two portions, first portion 66 is towards the vane ID platform (subjected to hot gases), experiencing low pressure, while second portion 68 is towards lower end (subjected to cold gases), experiencing high pressure. In use, strip seal 60 provides a seal between higher and lower pressure medium acting on strip seal 60. The higher pressure acting on a pressure face 72 of strip seal 60, presses the sealing face 70 of strip seal 60 onto first portion 66 of component R1, i.e. within upper side of grooved recess 64, wherein sealing face 70 is the surface that is substantially parallel to but on the opposite side of strip seal 60 than pressure face 72. In this way, the pressure difference across strip seal 60 enables it to seal two portions 66 and 68 of the component R1.

Figure 5:
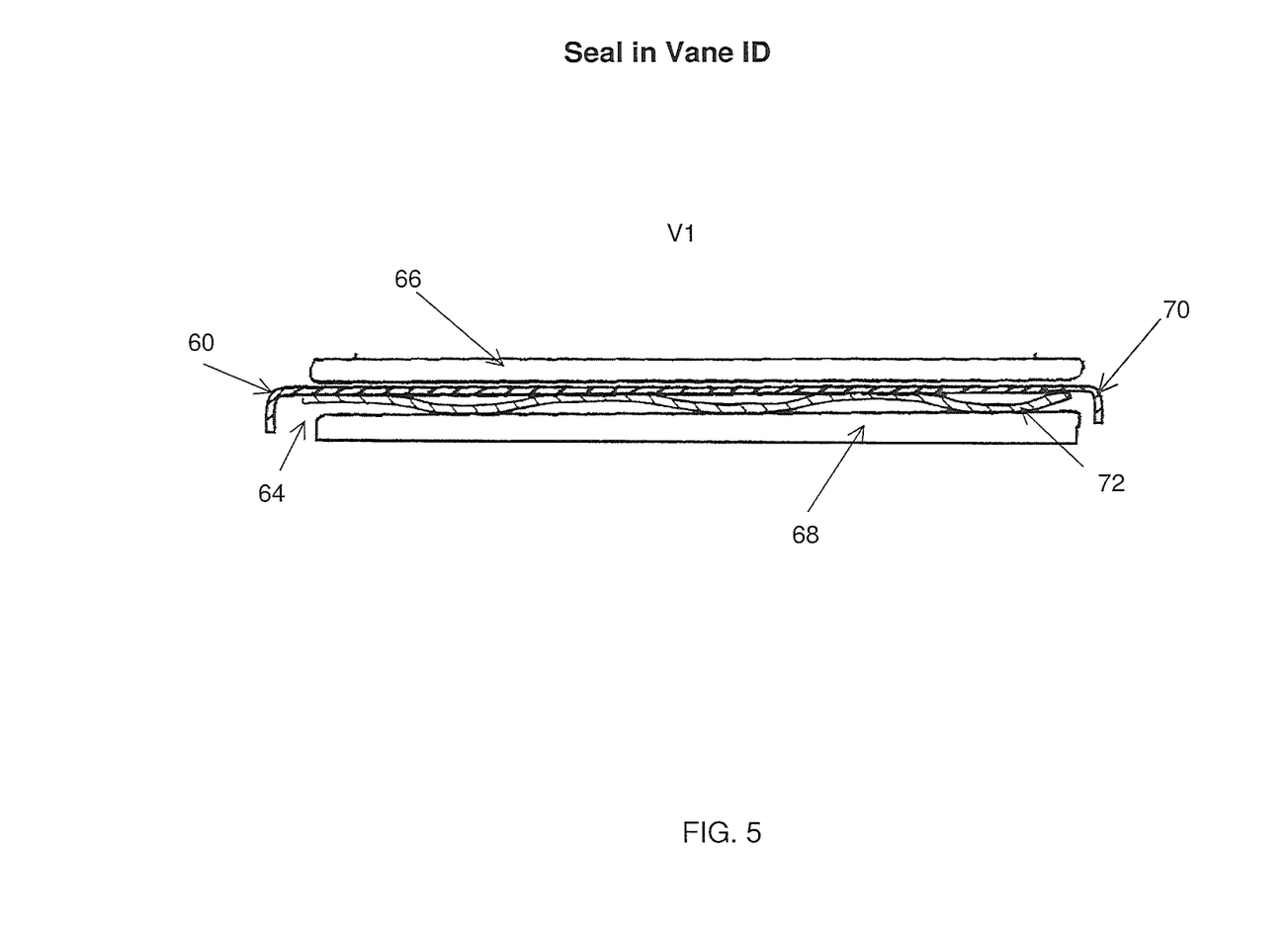
FIG. 5 is an expanded side view of a component such as vane ID platform showing a strip seal according to an exemplary embodiment of the invention.

FIG. 5 is an expanded side view of a component such as vane ID platform showing strip seal 60 according to an exemplary embodiment of the invention. In this embodiment, vane ID platform V1 houses strip seal 60, in grooved recess 64 of the vane ID platform, that has two portions, first portion 66 is towards the outer diameter of vane ID platform (subjected to hot gases) experiencing low pressure, while second portion 68 is towards the inner diameter of the vane ID platform. In use, strip seal 60 provides a seal between hot gas area between vane ID platform and rotor heat shield. The spring load of the sine-waveform of the pressure face 72, presses the strip seal 60 against the sealing face 70, thereby keeping the strip seal 60 in position.

Figure 6:
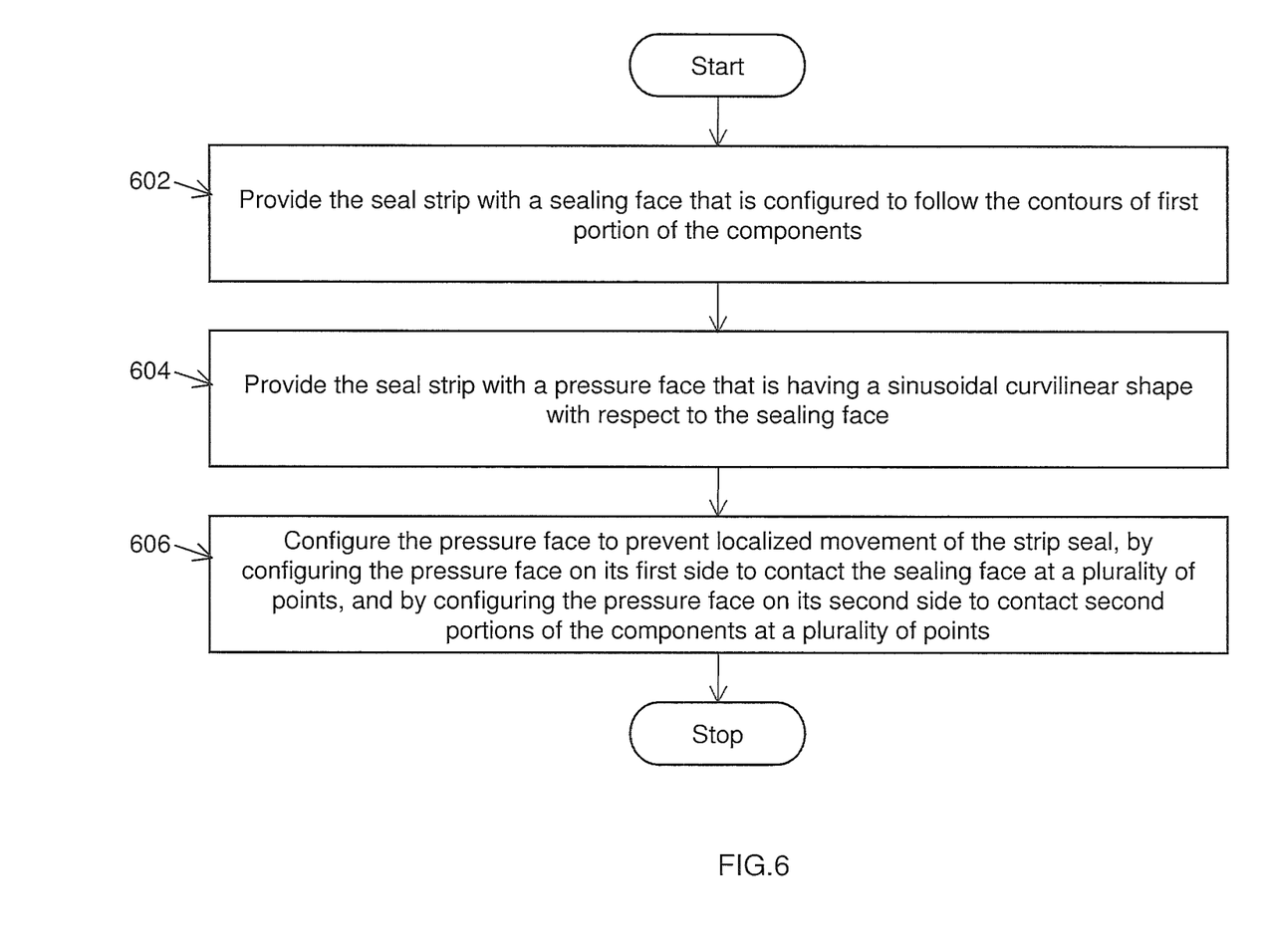
FIG. 6 is a flow chart of a method of configuring a strip seal according to an exemplary embodiment of the invention.

FIG. 6 is a flow chart of a method of designing a strip seal according to an embodiment of the invention. Strip seal 60 for sealing portions of components of gas turbine 100 is designed by providing (at step 602) seal strip 60 with a sealing face that is configured to follow the contours of first portions of the components. Further, strip seal 60 is provided (at step 604) with a pressure face that is having a sinusoidal curvilinear shape with respect to the sealing face. Finally, at step 606, the pressure face of strip seal 60 is configured to prevent localized movement of strip seal 60, by configuring the pressure face on its first side to contact the sealing face at a plurality of points, and by configuring the pressure face on its second side to contact second portions of the components at a plurality of points. In order to configure the pressure face, operational excitation frequency of each portion of the components is determined using known techniques. Thereafter, a frequency is calculated/measured that strip seal 60 is expected to be exposed. Based on this frequency the sinusoidal curvilinear shape is configured and the contact points where the pressure face contacts the sealing face and the second portions of components are selected.

Figure 7:
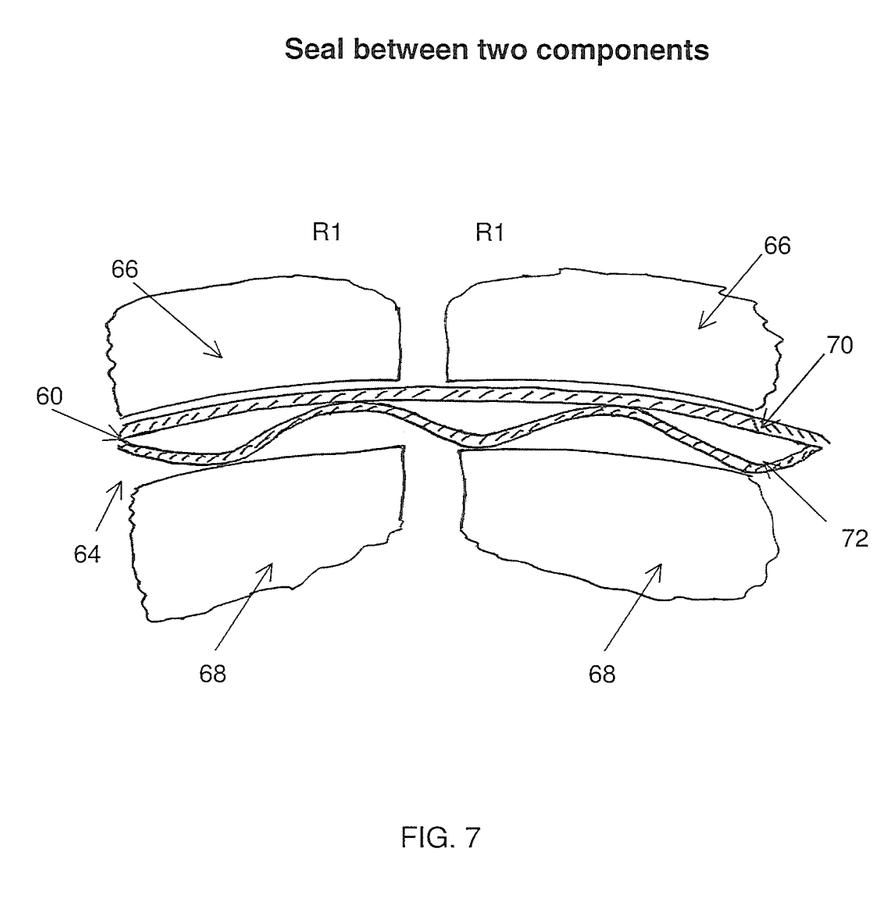
FIG. 7 is an expanded front view of a strip seal arrangement between two components, in accordance with an embodiment of the invention.

It will be apparent to a person skilled in the art that strip seal arrangements described so far have been positioned in components along their radial axis. However, these seals could also be used to seal two components along their circumferential axis. FIG. 7 is an expanded front view of a strip seal arrangement between two components, in accordance with an embodiment of the invention. In this embodiment, two adjacent rotor heat shields (or adjacent blades) are connected via strip seal 60 that is housed across grooved recesses 64 of both rotor heat shields R1. The grooved recess 64 of the rotor heat shields have two portions, first portion 66 is towards the outer diameter of the rotor heat shield or vane ID platform (subjected to hot gases), while second portion 68 is towards lower end (subjected to cold gases). In use, strip seal 60 provides a seal between higher and lower pressure medium acting on strip seal 60. The higher pressure acting on a pressure face 72 of strip seal 60, presses the sealing face 70 of strip seal 60 onto first portion 66 of component R1, i.e. within upper side of grooved recess 64, wherein sealing face 70 is the surface that is substantially parallel to but on the opposite side of strip seal 60 than pressure face 72. In this way, the pressure difference across strip seal 60 enables it to seal two portions 66 and 68 of the components.

As the skilled person would appreciate, the preferred reconfiguration for a given application is dependent on many factors, not limited to seal resonance performance, wherein different circumstances can be optimally served by different strip seal 60 reconfiguration methods wherein the various exemplary embodiments provide useful alternatives.

In a further exemplary embodiment the known properties of the strip seal 60 that are used in the calculation include length, thickness, width, and a material property of strip seal 60 such as the dynamic modulus of elasticity.

While exemplary embodiments have been described with reference to gas turbine 100, embodiments of the invention can be used in other applications where there is potential for premature failure of strip seals due to resonance.

Further, although the disclosure has been herein shown and described in what is conceived to be the most practical exemplary embodiment, it will be recognized by those skilled in the art that departures can be made within the scope of the disclosure, which is not to be limited to details described herein but is to be accorded the full scope of the appended claims so as to embrace any and all equivalent devices and apparatus.

The invention claimed is:

1. A strip seal for sealing portions of components of a gas turbine, the strip seal arrangement comprising:
   a sealing face, the sealing face configured to follow the contours of first portions of the components; and
   a pressure face, the pressure face having a sinusoidal curvilinear shape with respect to the sealing face, the pressure face configured to prevent localized movement of the strip seal;
   wherein the pressure face on its first side is configured to contact the sealing face at a plurality of points, and the pressure face on its second side is configured to contact second portions of the components at a plurality of points,
   wherein the pressure face is sealed to the sealing face at distal ends of the strip seal, and
   wherein a side of the sealing face is arranged to contact the first portions of the components and a lengthwise section of the side of the sealing face is planar.

2. The strip seal of claim 1, wherein the strip seal is configured to be received in one or more grooved recesses of the components such that it extends between the two portions of the component so as to provide a seal between a high pressure acting on the first portions of the components and a low pressure acting on the second portions of the components.

3. The strip seal of claim 1 comprising:
   a length extending between a first and second distal ends of the strip seal.

4. The strip seal of claim 1 comprising:
   a thickness between 0.2 mm and 0.8 mm+/0.1/0.1 mm at the plurality of points where the pressure face contacts the sealing face.

5. The strip seal of claim 1, wherein the sinusoidal curve shape of the pressure face forms projections that are configured to prevent localized movement by being configured to extend from the pressure face so as to bias the sealing face against a wall of a grooved recess of the component.

6. The strip seal of claim 1, wherein the strip seal has a first layer that forms the sealing face and a second layer that forms the pressure face.

7. The strip seal of claim 6, wherein the second layer has a sinusoidal curvilinear shape with respect to the first layer having a straight line shape.

8. The strip seal of claim 1, wherein the sealing face has a curved portion and a planar portion.

9. The strip seal of claim 8, wherein the sealing face has a curved portion that curves in the lengthwise direction of the strip seal at one end of the strip seal and a planar portion at the other end of the strip seal.

10. The strip seal of claim 1, wherein the pressure face is configured to prevent localized movement of the strip seal by biasing the sealing face against the first portions of the component.

11. A method for designing a strip seal for sealing portions of components of a gas turbine, the method comprising:
    providing the seal strip with:
    a sealing face, the sealing face configured to follow the contours of first portions of the components; and
    a pressure face, the pressure face having a sinusoidal curvilinear shape with respect to the sealing face;
    configuring the pressure face to prevent localized movement of the strip seal, by configuring the pressure face on its first side to contact the sealing face at a plurality of points, and by configuring the pressure face on its second side to contact second portions of the components at a plurality of points; and
    determining operational excitation frequency of each of the portions of the components.

12. Method as claimed in claim 11 comprising:
    configuring the sinusoidal shape of the pressure face depending on at least one of measurements and calculations done based on a frequency that the strip seal is expected to be exposed.

13. Method as claimed in claim 12, comprising:
    sealing the pressure face to the sealing face at distal ends of the strip seal;

arranging a side of the sealing face to contact the first portions of the components; and configuring a lengthwise section of the side of the sealing face to be planar.

14. Method as claimed in claim 11, wherein the plurality of contact points of the pressure face towards, the sealing face and the second portions of the components, are determined based on at least one of calculations and measurements.

15. A gas turbine comprising a strip seal according to claim 1.

* * * * *